US008070592B2

(12) United States Patent
Kromydas

(10) Patent No.: US 8,070,592 B2
(45) **Date of Patent: *Dec. 6, 2011**

(54) SYSTEM FOR PROVIDING MULTI-GAME REEL STRIPS

(75) Inventor: Stanley Kromydas, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 514 days.

This patent is subject to a terminal disclaimer.

(21) Appl. No.: 12/264,099

(22) Filed: Nov. 3, 2008

(65) Prior Publication Data

US 2010/0113127 A1 May 6, 2010

(51) Int. Cl.
*G06F 17/00* (2006.01)
*G06F 19/00* (2011.01)

(52) U.S. Cl. ................ 463/20; 463/21; 463/31; 463/30; 273/143 R

(58) Field of Classification Search ........................ None
See application file for complete search history.

(56) References Cited

U.S. PATENT DOCUMENTS

| | | | | |
|---|---|---|---|---|
| 5,074,559 | A * | 12/1991 | Okada | 463/21 |
| 5,984,782 | A * | 11/1999 | Inoue | 463/20 |
| 6,726,204 | B2 * | 4/2004 | Inoue | 273/143 R |
| 7,452,276 | B2 * | 11/2008 | Loose et al. | 463/31 |
| 7,654,899 | B2 * | 2/2010 | Durham et al. | 463/30 |
| 2008/0102922 | A1 | 5/2008 | Okada | |
| 2008/0194315 | A1 * | 8/2008 | Seelig et al. | 463/20 |
| 2009/0181755 | A1 * | 7/2009 | Gagner et al. | 463/20 |
| 2009/0227357 | A1 * | 9/2009 | Rasmussen | 463/21 |

* cited by examiner

*Primary Examiner* — Paul A. D'Agostino
(74) *Attorney, Agent, or Firm* — Steptoe & Johnson LLP

(57) ABSTRACT

A system for varying the symbols used on a mechanical reel strip are disclosed. A reel strip comprises a plurality of symbols, each of the symbols associated with a symbol group. Each of the symbol groups is associated with a symbol group designation position on the reel strip. By varying the designation position on the reel strip, the symbols used with each reel strip can be modified. When multiple mechanical reels are used in a gaming machine, the symbol designating position for each reel strip can be the same as any other reel strip or can vary from any of the other reel strips. As such, an endless number of games and game variations may be created and deployed.

14 Claims, 5 Drawing Sheets

FIG. 3
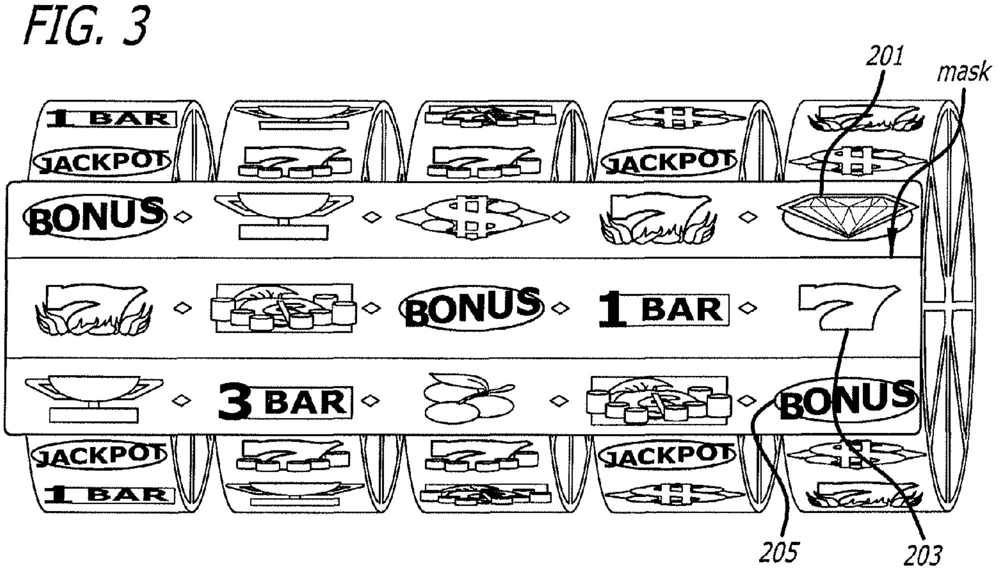
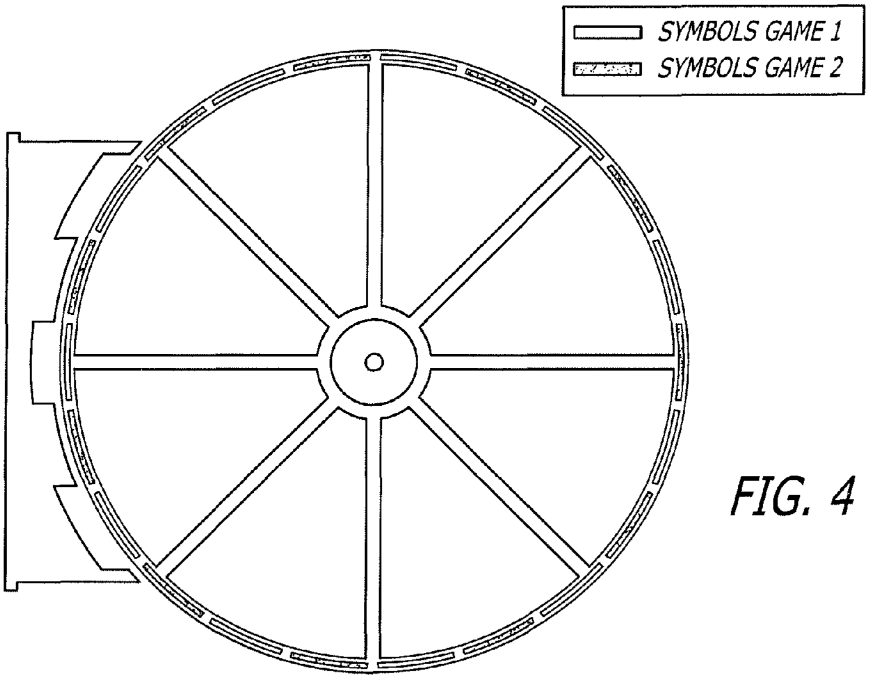
FIG. 4

SYSTEM FOR PROVIDING MULTI-GAME REEL STRIPS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS-REFERENCE TO RELATED APPLICATIONS

This application is related to copending U.S. patent application Ser. No. 12/264,084, filed Nov. 3, 2008, entitled METHOD FOR PROVIDING MULTI-GAME REEL STRIPS, which is hereby incorporated by reference in its entirety.

FIELD

Embodiments disclosed herein relate generally to mechanical gaming machines providing two or more games from one set of mechanical reels. Embodiments disclosed herein relate generally to methodologies that provide two or more games on a mechanical gaming machine.

BACKGROUND

Traditionally, various types of gaming machines have been developed with different features to captivate and maintain player interest. For example, gaming machines may include flashing displays, lighted displays, or sound effects to capture a player's interest in a gaming device.

Additionally, over the years, gaming machines have grown in sophistication and features to maintain player interest. For example, the mechanical reels of traditional gaming machines have been replaced with video depictions of spinning reels. Some people believe video gaming machines provide a richer gaming experience for players by including graphics or animation as part of the game. Nevertheless, mechanical gaming machines continue to be successful even though there are physical limitations as to the features that may be provided on a mechanical gaming machine. For example, symbols on the mechanical reels are located at fixed positions on the reels so that the symbols cannot be readily moved or animated.

Accordingly, there is a continuing need for slot machine variants that provide a player with enhanced excitement without departing from the original slot machine gaming concept.

SUMMARY

Briefly, and in general terms, various embodiments are directed to a method for providing multiple games on gaming machine having mechanical reels with modifiable symbol sets. More particularly, there is disclosed a reel strip having multiple symbols thereon. The starting or "Number 1" position of the reel strip is the normal starting position on the reel strip. This starting position may be varied so that different symbols may be used with different games. That is, by starting at a different position on the reel strip, different symbol sets or subgroups may be used in different games.

Briefly, and in general terms, various embodiments are directed to reel strips allowing for multiple games to be provided on a mechanical gaming machine. The same reel strip may be used, but by varying the start position on the reel strip, different symbol subgroups may be used with different games or themes.

Other features and advantages will become apparent from the following detailed description, taken in conjunction with the accompanying drawings, which illustrate by way of example, the features of the various embodiments.

BRIEF DESCRIPTION OF THE DRAWING

FIG. 3 is an example embodiment of multigame reel strips positioned on mechanical reels.

FIG. 4 is profile view of a mechanical reel including a multigame reel strip.

DETAILED DESCRIPTION

Figure 1:
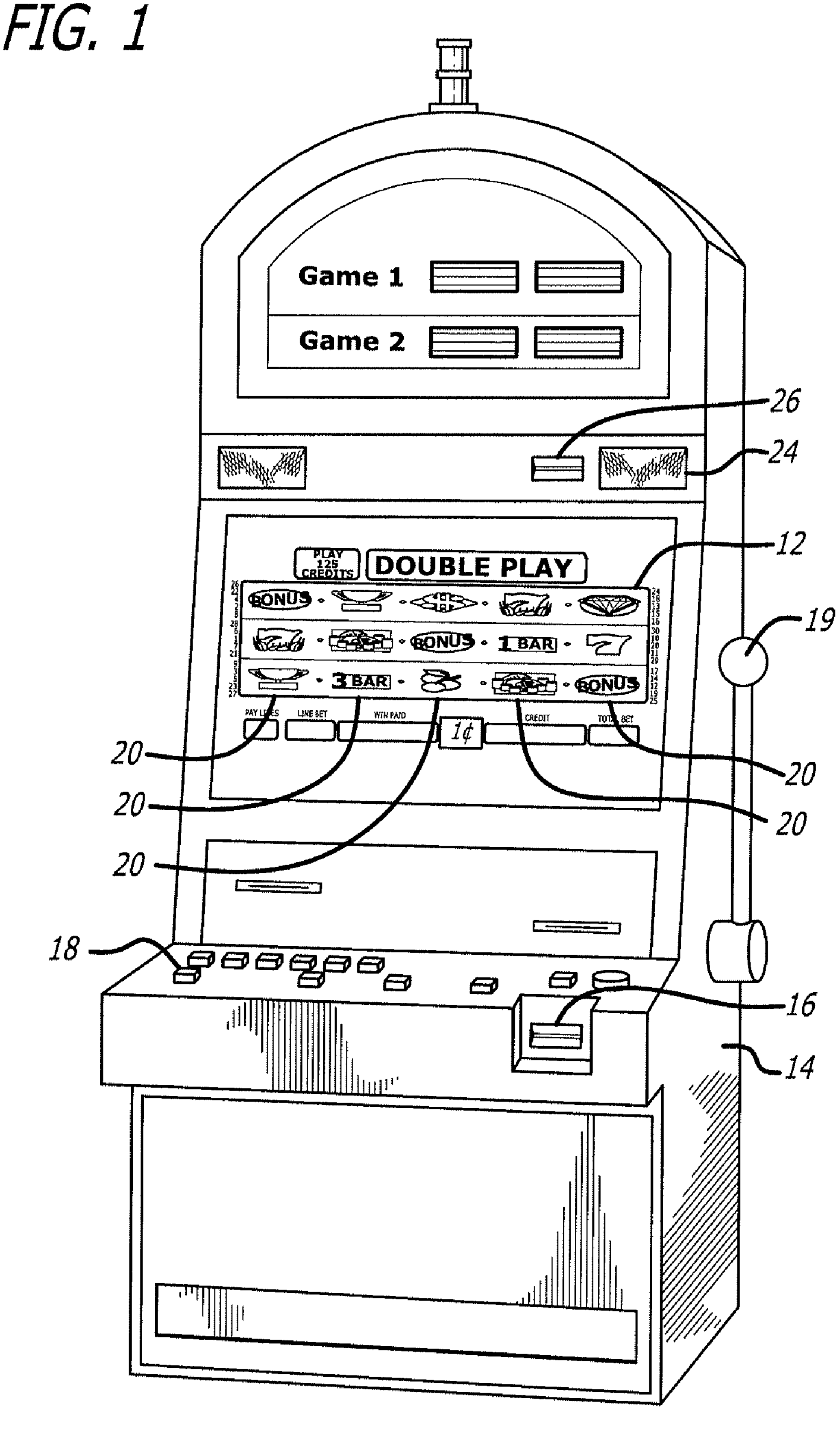
FIG. 1 is an example embodiment of a gaming machine for use with an embodiment of downloadable reels strips.

The present system is directed to providing multiple games for play on a mechanical or electromechanical gaming machine. More particularly, the present system provides a multigame configuration by providing two or more sets of symbols on each mechanical reel. Each symbol set is allocated to a particular game. The multiple symbol sets on the mechanical reels allows a mechanical gaming machine to offer more than one game to a player.

Referring now to the drawings, wherein like reference numerals denote like or corresponding parts throughout the drawings and, more particularly to FIGS. 1-5, there are shown various embodiments of a system for providing multigame mechanical reel strip.

Specifically, FIG. 1 illustrates a mechanical gaming machine 10. The gaming machine 10 includes five mechanical reels 20 that are visible through a display window 12. A standard reel mechanism may be used, for example, a Bally Alpha S9® system. Those skilled in the art will appreciate that the gaming machine 10 may have any number of mechanical reels 20.

Figure 2:
FIG. 2 is an example embodiment of multigame reels strips for use with a mechanical reel gaming machine.
Figure 5:
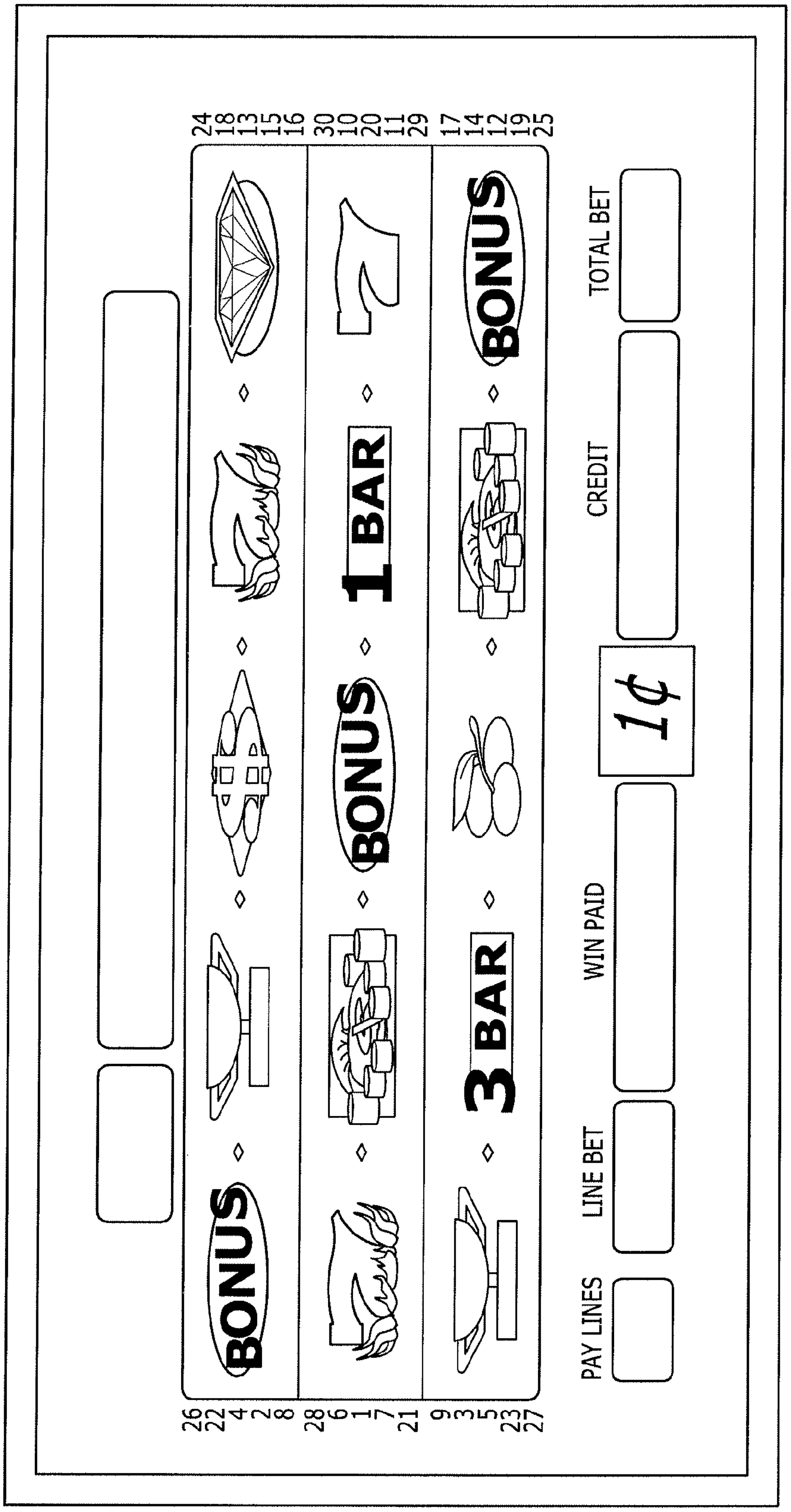
FIG. 5 is an example embodiment of a multigame reel strips viewable through a gaming machine display.

Each mechanical reel 20 includes a plurality of symbols 22 positioned on the outer circumference of the mechanical reel 20. The mechanical reels 20 may have any set number of symbols placed on the reel. Additionally, in one or more embodiments, the mechanical reels 20 includes a removable reel strip that is positioned around the basket portion of the mechanical reels 20. The removable reel strips may be removed and inserted into the gaming machine as needed by a casino operator. Referring to FIG. 2, five reel strips 100 are shown. Each reel strip 100 includes twenty-two symbols 122. Those skilled in the art will appreciate that any number of symbols may be placed on the reel strips. In one embodiment, the reel strips contain symbols for use with two different games. For example referring to FIG. 2, the symbols marked with an "a" are designated for use with a first game. Additionally, the symbols with the notation "b" are designated for use with a second, different game. In other words, the reel strips 100 assign positions on the strip for use with a specific game. More particularly, subsets of the symbols located on the reel strip are allocated to a first game such that when a "first game" or Game 1 is selected by a player or the controller of the gaming machine, and when the game is in play, then only those positioned in the "a" position will be used during game play. The symbols in the "b" position will not be eligible for play. Additionally, the portions of the reel strip allocated to the "second game" or Game 2 (e.g., "b position" on FIG. 2), are used when the second game is selected and is in play.

As discussed above, a standard reel mechanism may be used. However, the reel mechanism and the associated reel strip employ two or more symbol designating positions. These designating positions are used to determine which symbol group (or subset of symbols) are used by the reel strip during game play. This is accomplished by setting the symbol designating position as the starting position on the reel strip. In this way, the symbol sets used in the different games can be varied. By way of example and not by way of limitation, a first game theme uses the standard designation or default position, as is currently used in gaming establishments. However, for a second game theme, the designating position may be the second, third, fourth, or any other symbol position located on the reel strip. In this way, a custom mask may be used, but all other components of the gaming machine and reel mechanism are maintained. A controller may be used to generate a signal to select the one or more starting positions and associated symbol groupings. In another embodiment, a player may select which symbols to use by activating an input device, e.g., a button or touch screen, associated with the gaming machine.

In another embodiment, the reel mechanism includes an encoder disk that positions the reel and locates the symbol group designating position as stop 1 for the first set of symbols that are used in a first game. The second stop on the encoder disk is used for position 2, and this symbol group designating starting position is used as the first symbol in a second game. In this embodiment, the second game theme is different from the first game theme. That is, this second symbol group designating position is used as the symbol group determinator for use in the second game. Likewise, if a third symbol set exists on the encoder disk, then the third position on the reel strip may be used as the designating position to determine a third symbol group for use with the third game. In other words, one reel strip may be used to provide any number of different symbol groups for use with any number of different games merely by varying the symbol group designating position on the reel strip. This technique allows for variation in reel symbols used in game play, but it allows the standard components used in conjunction with the reel strip to remain the same.

It will also be appreciated by those skilled in the art that when multiple reels are used in the gaming machine, the designating position (and associated symbol groups or subgroups used with that reel) can vary with each reel used in the gaming machine. By way of example and not by way of limitation, a first reel can begin with a first designating position and use the symbols associated with the first designating symbol subgroup. However, a second reel can use either its first designating position or any other designating position to select any desired symbol subgroup for use with the second reel, and so on. Consequently, any number of reels may be used in this manner, and any combination of reels can be used with the same or a different designating position to maintain or vary the symbol subgroups used for each reel. As such, an endless number of games and game variations may be created and deployed.

Optionally, in one embodiment, a position on the reel strip may be allocated as both a game one and a game two position. For example, a wild symbol may be used for both games and may be playable when either game one or game two is engaged.

Symbols 201, 203 and 205 each reside in an "a" position on a reel strip 100. Accordingly, in one embodiment, symbols 201, 203 and 205 are designated for use with a game one of the gaming machine. Further, symbols 202, 204 and 206 each reside in a "b" position on a reel strip 100. Accordingly, in one embodiment, symbols 202, 204 and 206 are designated for use with a game two of the gaming machine. In one example, game one is selected for play on a gaming machine 10, and the mechanical reels are spun. The resulting symbols that are shown will only be symbols in the "a" position as illustrated in FIG. 3. Symbols 201, 203 and 205, each of which are in the "a" position and are associated with game one are shown in the resulting reel spin. The intermixed "b" positioned symbols are not viewable. In one embodiment, a reel mask is positioned over the reel strip to hide the "b" symbols from view. In other words, the mask will allow the player to see only those symbols that relate to the game being played.

Referring back to FIG. 1, the mechanical reels 20 are housed in a gaming cabinet 14. The main cabinet 14 of the gaming machine 10 is a self-standing unit that is generally rectangular in shape. In other embodiments, the cabinet (not shown) may be a slant-top, bar-top, or table-top style cabinet. However, any shaped cabinet may be used with any embodiment of the gaming machine 10 and sized for a player to be able to sit or stand while playing a game. Additionally, the cabinet 14 may be manufactured with reinforced steel or other rigid materials that are resistant to tampering and vandalism.

The gaming machine 10 includes one or more input mechanisms. In one embodiment, the gaming machine 10 may include a plurality of player-activated buttons 18, which may be used for numerous functions such as, but not limited to, selecting a wager denomination, selecting a number of games to be played, selecting a wager amount per game, initiating a game, or cashing out money from the gaming machine 10. The buttons 18 function as input mechanisms and may include mechanical buttons, electromechanical buttons or touch screen buttons. Optionally, handle 19 may also serve as an input mechanism. More particularly, the handle 19 may be "pulled" by a player to initiate a game.

The gaming machine 10 may also include one or more speakers 24. Various types of audio may be output to the speakers 24.

In one embodiment, the main cabinet 16 houses a main gaming machine processor (not shown) that includes a CPU, circuitry, and software for receiving signals from the player-activated buttons 18 and a handle 14, operating the games and transmitting signals to the respective game display 12 and speakers 29. Alternately, in an optional embodiment, the game management unit is housed outside of the main cabinet, but is operatively connected to the gaming machine 10.

In various embodiments, the gaming machine 10 shown may also include a ticket reader/ticket printer system 16 that is associated with a cashless gaming system. In one embodiment, the ticket reader/ticket printer system may print out and/or issue tickets. In another embodiment, the ticket reader/ticket printer system 16 is capable of accepting previously printed vouchers, paper currency, promotional coupons, or the like. The ticket reader/ticket printer system 16 of the cashless gaming system may generate vouchers having printed information that includes, but is not limited to, the value of the voucher (i.e., cash-out amount) and a barcode that identifies the voucher.

Optionally, in an alternate embodiment, the ticket reader/ticket printer system 16 includes a bill acceptor, which is an assembly that examines currency or coupons and communicates the value to the machine. Accepted items register as credits, and rejected items are returned to the player. In one optional embodiment, the slot 16 works in conjunction with a bill acceptor assembly. Alternately, in an optional embodiment, the gaming machine 10 includes a separate bill acceptor (not shown). In one embodiment, the bill acceptor device may include an embedded web server that delivers a management user interface to a web browser. The management user interface may be used to control and configure various functions and operations of the bill acceptor.

The gaming machine 10 may further include a player tracking system (not shown). The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on the gaming machine 10. These input components include, but are not limited to, a card reader 26 for receiving a player tracking card, a keypad or equivalent, an electronic button receptor, a touch screen and the like. The player tracking system may also include a database of all qualified players (i.e., those players who have enrolled in a player rating or point accruing program). Generally, the database for the player tracking system is separate from the gaming devices.

The gaming machine 10 includes a card reader 26 that may be used to read player tracking cards. Additionally, the card reader 26 may also read casino employee cards. Each time a card is inserted into the reader, it monitors and tracks player and employee activity.

Figure 6:
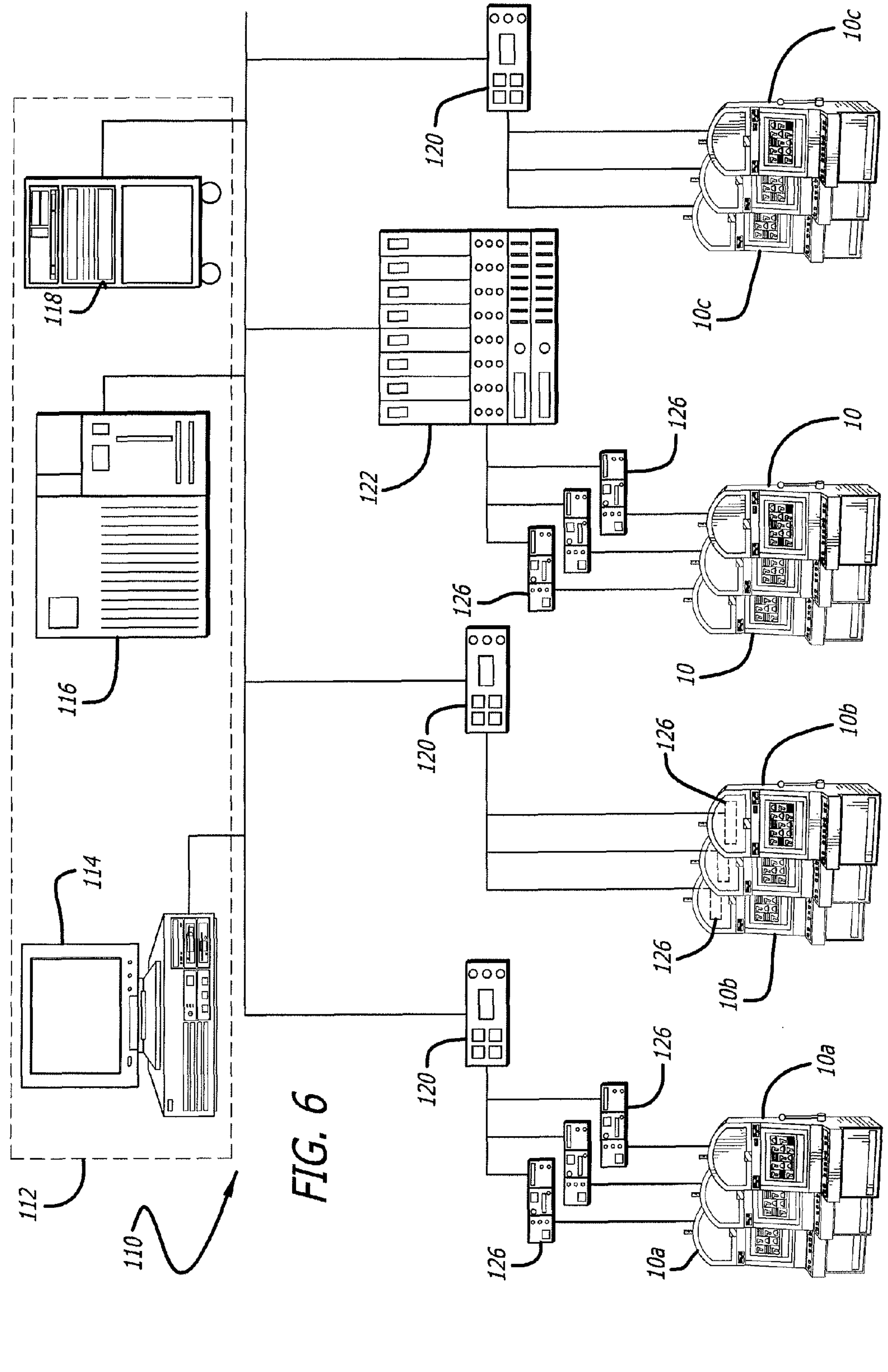
FIG. 6 is a schematic illustration of a casino gaming system for use in accordance with an embodiment of the downloadable reel strips.

Referring to FIG. 6, one example embodiment of a casino gaming system 110 is illustrated. The casino gaming system 110 comprises one or more gaming machines 10 operatively connected via a network to a back end system 112. The back end system 112 may be configured to comprise one or more servers. The type of server employed is generally determined by the platform and software requirements of the gaming system. In one example embodiment, as illustrated in FIG. 1, the back end system 112 is configured to include three servers: a casino floor controller 114, a casino management server 116 and a casino database 118. The casino floor controller 114 is a part of the player tracking system for gathering accounting, security and player specific information. The casino management server 116 and casino database 118 work together to store and process information specific to both employees and players. Player specific information includes, but is not limited to, passwords, biometric identification, player card identification, and biographic data. Additionally, employee specification information may include biographic data, biometric information, job level and rank, passwords, authorization codes and security clearance levels.

Overall, the back-end system 112 performs several fundamental functions. For example, the back-end system 112 can collect data from the casino floor as communicated to it from other network components, and maintain the collected data in its database. The back-end system 112 may use casino floor data to generate a report used in casino operation functions. Examples of such reports include, but are not limited to, accounting reports, security reports, and usage reports. The back-end system 112 may also pass data to another server for other functions. Alternatively, the back-end system 112 may pass data stored on its database to floor hardware for interaction with a game or game player. For example, data such as a game player's name or the amount of a ticket being redeemed at a game may be passed to the floor hardware. Additionally, the back-end system 112 may comprise one or more data repositories for storing data. Examples of types of data stored in the system server data repositories include, but are not limited to, information relating to individual player play data, individual game accounting data, gaming machine accounting data, cashable ticket data, and sound data, including optimum audio outputs for various casino settings.

The network bridges 120 and network rack 122 are networking components used for networking, routing and polling gaming machines 10. In one embodiment, the gaming machines 10 are connected via a network to a network bridge 120, and the network bridge 120 connects to a back-end system 112. Optionally, the gaming machines 10 may connect to the network via a network rack 122, which provides for a fewer number of connections to the back-end system 112. Both network bridge 120 and network rack 122 may be classified as middleware, and facilitate communications between the back-end system 112 and the gaming machines 10. The network bridges 120 and network rack 122 may comprise data repositories for storing network performance data. Such performance data may be based on network traffic and other network related information. Optionally, the network bridge 120 and the network rack 122 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

Game monitoring units (GMUs) 126 connect gaming devices, such as gaming machines 10, to networking components (e.g., network bridges, network racks, and the like). The GMUs may be installed within the gaming machine cabinet or may be located external to the gaming machine 10. In one embodiment, the GMU 126 is a separate component located outside the gaming machine 10*a*. Alternatively, in another embodiment, the GMU 126 is located within the gaming machine 10*b*. Optionally, in an alternative embodiment, one or more gaming devices 10*c* connect directly to a network and are not connected to a GMU 126.

A GMU 126 is a device connected to the circuitry of a gaming machine 10 that monitors the game, coin status, player winnings, and/or the gaming machine. The GMU 126 sends the monitored information to a server on the back-end system 112 for processing. Additionally, the GMU 126 may record gaming machine operation and transfer the information to the back-end system 112. Those skilled in the art will appreciate that the functionality of the GMUs 126 may vary, and that the GMU 126 may be configured to perform additional tasks. Some GMUs 126 have much greater capability and can perform such tasks as presenting and playing a game using a display (not shown) operatively connected to the GMU 126.

The gaming machine 10 acts as terminals for interacting with a player playing a casino game. In various embodiments, any of the gaming machines 10 may be any type of electronic or mechanical gaming devices, such as, but not limited to, a mechanical reel spinning slot machine, video slot machine, video poker machine, keno machine, video blackjack machine, or a gaming machine offering one or more of the above-described games. Examples include, but are not limited to, the S6000 mechanical reel spinner and the Alpha video slot machine from Bally Gaming.

Additionally, one or more of the gaming machines 10 may comprise one or more data repositories (not shown) for storing data. Examples of information stored by the gaming machines 10 includes, but is not limited to, accounting data, maintenance history information, short and/or long-term play data, real-time play data, sound data, celebration activity data, and triggering events data. The sound data may include, but is not limited to, audio files, sound clips, wav files, mp3 files and sound files saved in various other formats. Furthermore, each gaming machine 10 comprises an audio system for outputting sound.

The gaming machine 10 may also include one or more speakers 29. Various types of audio may be output to the speakers 29. The speakers 29 may be operatively connected to an amplifier (not shown). Alternately, the speakers 29 may be self-amplified. Optionally, the speakers 29 may be component speakers with a separate tweeter, midrange, and subwoofer to provide better sound imaging to the gaming machine patron. In yet another embodiment, the speakers 29 may be full range speakers (e.g., two-way, three-way or 4-way speakers). Optionally, various audio files for use with one or more audio features may be stored on the gaming machine 10.

Optionally, in one embodiment, the speakers 29 include a processor and an embedded web server. The web server is configured to deliver a management user interface to a web browser. The management user interface may be accessed in order to control various features and functions of the speakers 29.

In various embodiments, the gaming machine 10 shown may also include a ticket reader/ticket printer system 21 that is associated with a cashless gaming system. In one embodiment, the ticket reader/ticket printer system provides separate slots for performing various functions. More particularly, a slot 24 is provided to accept and read tickets. Additionally, a slot 22 is provided to print out and/or issue tickets. In one embodiment, the ticket reader (i.e., slot 24) of a cashless gaming system is capable of accepting previously printed vouchers, paper currency, promotional coupons, or the like. The ticket printer (i.e., slot 22) of the cashless gaming system generates vouchers having printed information that includes, but is not limited to, the value of the voucher (i.e., cash-out amount) and a barcode that identifies the voucher.

Optionally, in an alternate embodiment, a single slot (not shown) is used to accept and issue tickets. Tickets may be inserted into the single slot and read. Additionally, tickets may be issued from, or printed from, the same single slot.

Additionally, in an optional embodiment the ticket reader/ticket printer system 21 further includes a processor and an embedded web server. The embedded web server delivers a management user interface to a web browser. As discussed above, the management user interface may be accessed to control and configure various features and functions associated with the enhanced device (i.e., the ticket reader/ticket printer system 21). More particularly, in one embodiment, only the ticket printer 22 includes an embedded web server. The ticket printer 22 includes a processor that delivers web pages to one or more web browsers. Alternately, in another embodiment, only the ticket reader 24 includes an embedded web server. Similarly, the enhanced ticket reader 24 includes a processor. Optionally, in an alternate embodiment, both the ticket printer 22 and the ticket reader 24 include an embedded web server.

Optionally, in an alternate embodiment, the ticket reader/ticket printer system 21 includes a bill acceptor, which is an assembly that examines currency or coupons and communicates the value to the machine. Accepted items register as credits, rejected items are returned to the player. In one optional embodiment, the slot 24 works in conjunction with a bill acceptor assembly. Alternately, in an optional embodiment, the gaming machine 10 includes a separate bill acceptor (not shown). In one embodiment, the bill acceptor device may include an embedded web server that delivers a management user interface to a web browser. The management user interface may be used to control and configure various functions and operations of the bill acceptor.

The gaming machine 10 may further include a player tracking system (not shown). The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on the gaming machine 10. These input components include, but are not limited to, a card reader for receiving a player tracking card, a keypad or equivalent, an electronic button receptor, a touch screen and the like. The player tracking system may also include a database of all qualified players (i.e., those players who have enrolled in a player rating or point accruing program). Generally, the database for the player tracking system is separate from the gaming devices.

The gaming machine 10 includes a card reader 20 that may be used to read player tracking cards. Additionally, the card reader 20 may also read casino employee cards. Each time a card is inserted into the reader, it monitors and tracks player and employee activity. In one embodiment, the card reader 20 may include an embedded web server that delivers a management user interface to a web browser. The management user interface may be used to control and configure various functions and operations of the card reader 20.

Further, the casino gaming system 110 may include one or more machine processing units (MPUs) which are circuitry that contain a microprocessor and memory, input/output interface, buffer, clock, and driver circuits. Optionally, in one embodiment, the MPU includes an embedded web server capable of delivering a management user interface to a web browser. The management user interface is used to control and manage the accessed MPU.

In various embodiments, the casino gaming system 110 includes one or more overhead signage controllers (not shown). The overhead signage controllers control the operation and function of display signs. Typically the display signs are digital display screens (such as a plasma display, LCD display, and the like), strategically placed in the casino for player viewing. The signs may indicate jackpot awards, advertisements, and other information. In one embodiment, a web server is embedded in the overhead signage controller. The web server delivers a management user interface to a web browser, which allows for control and management of the various signs/display screen connected to the overhead signage controller.

The casino gaming system may further employ various game controllers throughout the system. Generally, a game controller is a combination of hardware and software that supports a game for a group or bank of player terminals. Controller functions include but are not limited to: installation, setup and configuration of the game application; status of client and subscription lists, and storage; setups for attendant, network, and terminals, and access to snapshots. Examples of different types of controllers configured to support games include, but are not limited to, a Lottery Game Controller (LGC), Bingo Game Controller (BGC), Remote Game Controller (RGC), and Progressive Game Controller (PGC).

In various embodiments, a web server may be embedded into one or more game controllers. The embedded web server delivers a management user interface to a web browser. The management functions of the enhanced game may be accessed and controlled via the management user interface over a network. In this manner, one or more gaming devices may be connected to a web server by the network, and new symbol subgroups may be downloaded from the web server to the one or more gaming devices delivering new games using the newly downloaded symbol subgroups.

One of ordinary skill in the art will appreciate that the casino gaming system 110 may not have all the components and devices described above, and that the casino gaming system may have other components in addition to, or in lieu of, those devices/components mentioned here. Furthermore, while these devices are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gaming machine, comprising:

one or more mechanical game reels, each game reel having a reel strip located thereon;

a plurality of symbols located on each reel strip, each symbol and its symbol position being associated with one or more symbol subgroups, and each of a plurality of symbol subgroups being associated with a different starting position located on the reel strip;

a reel controller for selecting a first symbol position on the reel strip as the starting position on the reel strip, wherein the symbol subgroup associated with the first starting position on the reel strip is selected for use in a first game having a first theme, and wherein the symbol positions in the symbol subgroup of the first game are the only symbol positions available during the first game; and wherein the reel controller selecting a second symbol position on the reel strip as the starting position on the reel strip, wherein the symbol subgroup associated with the second starting position on reel strip is selected for use in a second game having a second theme, wherein the symbol positions in the symbol subgroup of the second game are the only symbol positions available during the second game, and wherein the first symbol subgroup and the second symbol subgroup includes partially overlapped groups of reel symbols; and an encoder disk associated with each reel that positions the reel at the first starting position for use with the first symbol subgroup in the first game and positions the reel at the second starting position for use with the second symbol subgroup in the second.

2. The gaming machine of claim 1, wherein the first symbol subgroup and the second symbol subgroup includes separate, non-overlapping groups of reel symbols.

3. The gaming machine of claim 1, wherein the gaming machine is connected to a server via a network, and wherein new symbol subgroups are downloadable from the server to generate new games on the gaming machine using the newly downloaded symbol subgroups.

4. The gaming machine of claim 1, wherein a reel mask is positioned over the reel strip to cover reel symbols associated with the non-selected symbol group during game play.

5. A mechanical reel, comprising:

a reel strip, the reel strip having a plurality of symbols located thereon, a plurality of symbol groups, wherein each symbol and its symbol position on the reel strip is associated with at least one symbol subgroup, and wherein every symbol subgroup includes a different group of symbols;

wherein the reel strip including a plurality of starting positions, each starting position associated with a particular symbol subgroup, and wherein a selection of a starting position on the reel strip results in selection of the associated symbol subgroup, wherein the symbol positions in a first symbol subgroup of a first game are the only symbol positions available during the first game, wherein the symbol positions in a second symbol subgroup of a second game are the only symbol positions available during the second game, and wherein the first symbol subgroup and the second symbol subgroup includes partially overlapped groups of reel symbols; and an encoder disk associated with each reel that positions the reel at the first starting position for use with first symbol subgroup in the first game and positions the reel at the second starting position for use with second symbol subgroup in the second game.

6. The mechanical reel of claim 5, wherein the first symbol subgroup and the second symbol subgroup includes separate, non-overlapping groups of reel symbols.

7. The mechanical reel of claim 5, wherein the mechanical reel is connected to a server via a network, and wherein new symbol subgroups are downloadable from the server to generate new games on the mechanical reel using the newly downloaded symbol subgroups.

8. The gaming machine of claim 5, wherein a reel mask is positioned over the reel strip to cover reel symbols associated with non-selected symbol groups during game play.

9. A gaming system, comprising:

one or more mechanical game reels, each game reel having a reel strip located thereon;

a plurality of symbols located on each reel strip, each symbol and its symbol position being associated with one or more symbol subgroups, and each of a plurality of symbol subgroups being associated with a different starting position located on the reel strip;

a reel controller for selecting a first symbol position on the reel strip as the starting position on the reel strip, wherein the symbol subgroup associated with the first starting position on the reel strip is selected for use in a first game having a first theme; and wherein the reel controller selecting a second symbol position on the reel strip as the starting position on the reel strip, wherein the symbol subgroup associated with the second starting position on reel strip is selected for use in a second game having a second theme; and wherein the first symbol subgroup and the second symbol subgroup includes partially overlapped groups of reel symbols; and an encoder disk associated with each reel that positions the reel at the first starting position for use with the first symbol subgroup in the first game and positions the reel at the second starting position for use with the second symbol subgroup in the second game.

10. The gaming system of claim 9, wherein the first symbol subgroup and the second symbol subgroup includes separate, non-overlapping groups of reel symbols.

11. The gaming system of claim 9, wherein the gaming system includes a server and a network, and wherein new symbol subgroups are downloadable from the server to generate new games on the gaming machine using the newly downloaded symbol subgroups.

12. The gaming system of claim 9, wherein a reel mask is positioned over the reel strip to cover reel symbols associated with the non-selected symbol group during game play.

13. The gaming system of claim 9, wherein gaming system includes multiple gaming machines.

14. The gaming system of claim 13, wherein different gaming machines within the gaming system include symbol subgroups that comprise different reel symbols than the reel symbols in the symbol subgroups of other gaming machines in the gaming system.

* * * * *